(12) United States Patent
Li et al.

(10) Patent No.: US 9,066,258 B2
(45) Date of Patent: Jun. 23, 2015

(54) D2D CONNECTION RECOVERY SCHEMES

(71) Applicants: Honggang Li, Beijing (CN); Qinghua Li, San Ramon, CA (US); Yuan Zhu, Beijing (CN); Xiaogang Chen, Beijing (CN); Jong-Kae Fwu, Sunnyvale, CA (US)

(72) Inventors: Honggang Li, Beijing (CN); Qinghua Li, San Ramon, CA (US); Yuan Zhu, Beijing (CN); Xiaogang Chen, Beijing (CN); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 13/751,252

(22) Filed: Jan. 28, 2013

(65) Prior Publication Data

US 2013/0272182 A1    Oct. 17, 2013

Related U.S. Application Data

(60) Provisional application No. 61/624,185, filed on Apr. 13, 2012.

(51) Int. Cl.
| | | |
|---|---|---|
| G08C 17/00 | (2006.01) |
| H04W 28/08 | (2009.01) |
| H04W 28/02 | (2009.01) |
| H04L 5/00 | (2006.01) |
| H04W 72/04 | (2009.01) |
| H04W 74/08 | (2009.01) |
| H04W 36/08 | (2009.01) |
| H04W 24/02 | (2009.01) |
| H04W 76/02 | (2009.01) |
| H04W 24/10 | (2009.01) |
| H04W 36/00 | (2009.01) |

(52) U.S. Cl.
CPC .............. *H04W 28/08* (2013.01); *H04W 28/02* (2013.01); *H04L 5/0001* (2013.01); *H04W 76/028* (2013.01); *H04W 72/042* (2013.01); *H04W 72/04* (2013.01); *H04W 74/0808* (2013.01); *H04W 24/10* (2013.01); *H04W 36/08* (2013.01); *H04W 76/023* (2013.01); *H04W 24/02* (2013.01); *H04W 36/0016* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2005/0153714 A1* | 7/2005 | Subrahmanya | 455/458 |
| 2009/0147715 A1* | 6/2009 | Ruy et al. | 370/311 |
| 2009/0221283 A1* | 9/2009 | Soliman | 455/426.1 |
| 2010/0165896 A1* | 7/2010 | Gong et al. | 370/311 |

(Continued)

FOREIGN PATENT DOCUMENTS

WO  WO-2011147462 A1  12/2011

OTHER PUBLICATIONS

"International Application Serial No. PCT/US2013/036120, International Search Report mailed Aug. 23, 2013", 3 pgs.

(Continued)

*Primary Examiner* — Kibrom T Hailu
(74) *Attorney, Agent, or Firm* — Schwegman Lundberg & Woessner, P.A.

(57) ABSTRACT

Schemes for recovering D2D connections between terminals (UEs) in an LTE network are described. The schemes may be applied in situations where a D2D connection is established between two UEs but is lost by, for example, one of the UEs entering a sleep state. The schemes may be applied to either centralized or distributed D2D systems. Some of the schemes are eNB-assisted while others are performed solely by the UEs.

20 Claims, 6 Drawing Sheets

(56) References Cited

U.S. PATENT DOCUMENTS

| | | |
|---|---|---|
| 2010/0169498 A1 | 7/2010 | Palanki et al. |
| 2010/0268775 A1 | 10/2010 | Doppler et al. |
| 2011/0038291 A1* | 2/2011 | Seok .............................. 370/311 |
| 2011/0128911 A1* | 6/2011 | Shaheen ........................ 370/328 |
| 2011/0161697 A1 | 6/2011 | Qi et al. |
| 2011/0170465 A1* | 7/2011 | Tavildar et al. ............... 370/311 |
| 2011/0191608 A1* | 8/2011 | Vetteth .......................... 713/310 |
| 2012/0015607 A1* | 1/2012 | Koskela et al. ................ 455/62 |
| 2012/0119902 A1* | 5/2012 | Patro et al. .................... 340/502 |
| 2012/0163261 A1* | 6/2012 | Vedantham et al. .......... 370/311 |
| 2012/0207071 A1* | 8/2012 | Zhu et al. ...................... 370/311 |
| 2013/0044660 A1* | 2/2013 | Edara et al. .................... 370/311 |

OTHER PUBLICATIONS

"International Application Serial No. PCT/US2013/036120, Written Opinion mailed Aug. 23, 2013", 6 pgs.

Doppler, Klaus, et al., "Device-to-Device Communication as an Underlay to LTE-Advanced Networks", IEEE Communications Magazine, 47(12), (Dec. 2009), 42-49.

* cited by examiner ns between D2D devices.

D2D CONNECTION RECOVERY SCHEMES

RELATED APPLICATIONS

This application claims the benefit of priority under 35 U.S.C. 119(e) to U.S. Provisional Patent Application Ser. No. 61/624,185, filed on Apr. 13, 2012, which is incorporated herein by reference in its entirety.

BACKGROUND

Device-to-device (D2D) communications is one means for improving the performance of LTE (Long Term Evolution) and other cellular networks. In D2D communications, terminals (referred to as user equipments or UEs in LTE) communicate with one another directly rather than being linked through the base station (referred to as an evolved node B or eNB in LTE). D2D communication between two or more D2D devices is typically very local, due to the short distance between D2D devices and therefore uses very lower transmit power. D2D communications is also a powerful way to increase spatial reuse of resources in cellular systems for higher throughput. The present disclosure deals with aspects of D2D communications relating to recovery of lost connections between D2D devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

D2D communications as an underlay to an LTE network may be implemented as either a centralized or a distributed system. In the latter case, UEs acting as D2D devices communicate directly without any eNB involvement. Such a distributed architecture is only appropriate where the D2D communication is out-of-band, using resources other than the licensed spectrum. When D2D communication takes place in the same licensed band as LTE cellular communications, a centralized system is necessary where the eNB retains control of the radio resource. That is, the eNB is responsible for permitting D2D communications between UEs to take place and for allocating the time-frequency resources to be used in the D2D links.

In either centralized or distributed D2D systems, there is overhead involved in initially establishing a D2D link between two UE devices. If a D2D connection established between two devices were to be lost, it would be desirable for there to be mechanisms for efficiently re-establishing the D2D connection to avoid the overhead associated with establishment of the connection. Described herein are schemes for D2D connection recovery for either centralized or distributed D2D systems. Some of the schemes are eNB-assisted while others are performed solely by the UEs.

System Description

Figure 1:
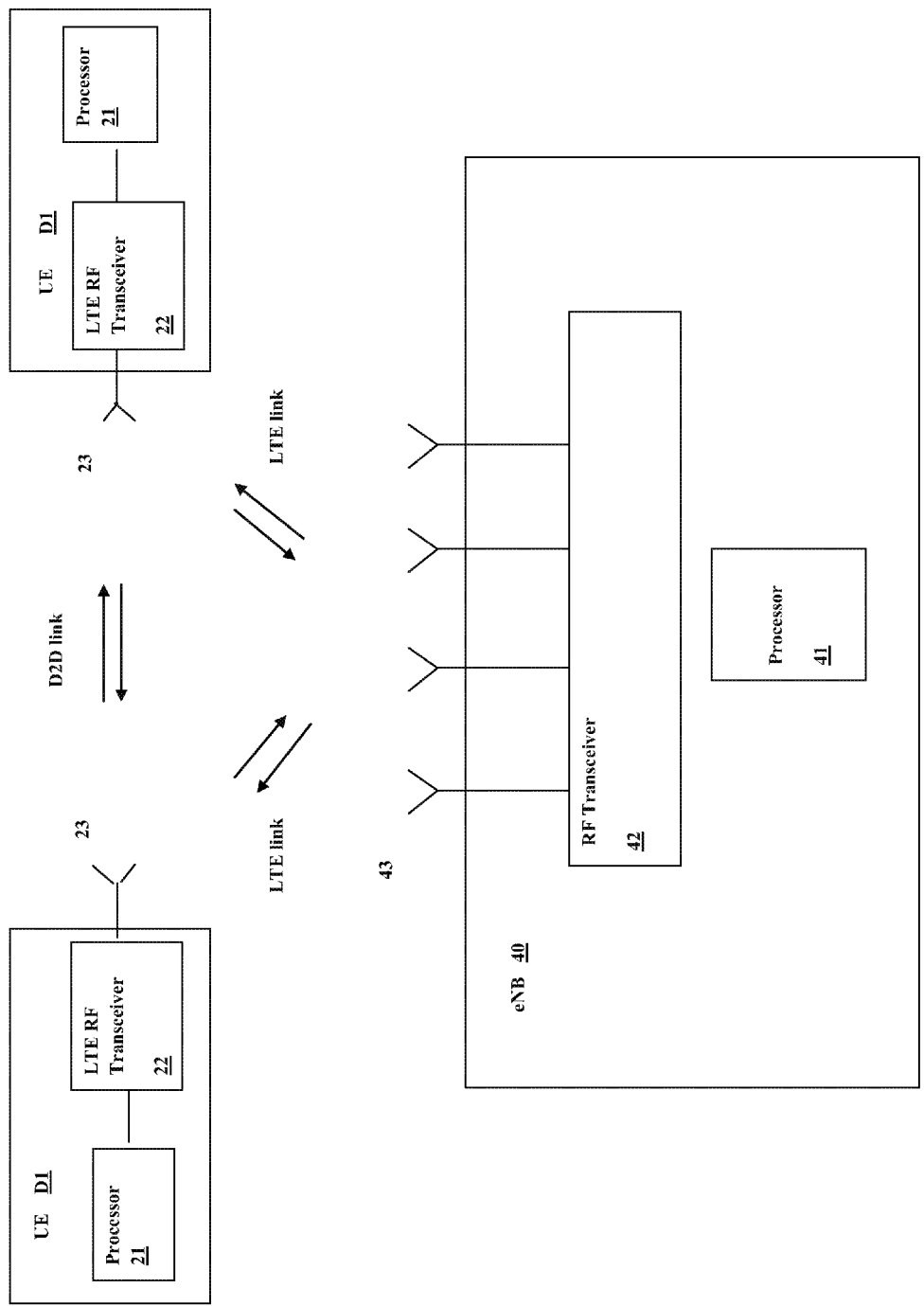
FIG. 1 shows example UE devices for D2D communications and an eNB.

FIG. 1 shows an example of a UE D1 and a UE D2, each of which incorporates a processor 21 interfaced to radio-frequency (RF) transceiving circuitry 22 that is connected to one or more antennas 23. A base station or eNB 40 is shown with a processor 41 interfaced to RF transceiving circuitry 42 that is connected to a plurality of antennas 43. The illustrated components are intended to represent any type of hardware/software configuration for providing air interfaces for both LTE and D2D communication and for performing the processing functions as described herein. In the embodiment shown in the figure, UEs D1 and D2 both communicate with the eNB 40 via LTE links and with one another via a D2D link.

D2D Connection Recovery Schemes

In some embodiments, the D2D connection recovery scheme is suitable for situations in which a UE with an established D2D connection goes into a sleep state (i.e., a power saving mode). D2D connection recovery in this case may be implemented as a non-eNB assisted or eNB-assisted scheme.

In an example of a non-eNB assisted D2D connection recovery scheme, assume that UEs D1 and D2 have an established D2D connection. When D2 is about to enter a power-saving mode, it can notify UE D1 when it will no longer be in sleep mode, $T_{wakeup}$, which either corresponds to the duration of the sleep state or an actual wake up time. Optionally, D2 may also send to the eNB using an uplink control channel. D1 can acknowledge the sleep message to let D2 know that it will be available when D2 wakes up. After receipt of the acknowledgement message from D1, D2 can then enter its sleep state, wherein entering the sleep state at this point can be made conditional upon receiving the acknowledgement from D1. After the time of $T_{sleep}$, D2 wakes up and sends a D2D recovery request to D1. D1 then responds with a D2D recovery response, and the D2D connection is recovered. D2 may or may not notify the eNB of the D2D connection recovery.

The less the involvement of the eNB in D2D connection recovery process, the better from the standpoint of efficiency because of the control overhead associated with eNB operation. In some cases, however, D2 and D1 are unable to negotiate before one of the devices enters a sleep or otherwise inactive state. For example, one device could undergo an abnormal power down. Or, there could be a failure in sending or receiving the sleep state notification or in negotiating an agreed upon sleep time $T_{sleep}$. In these and other such cases, the eNB can be configured to assist in recovering the D2D connection as described in the following. Assume that a D2D connection between D1 and D2 is lost. D1 wants to recover the D2D connection to D2 but has no knowledge as to when D2 will wake up. D1 sends the D2D recovery request to the eNB, and the eNB checks the status of D2. If D2 is in idle mode, the eNB will tell D1 when to retry during the next paging cycle for D2. At the time of the paging cycle, the eNB informs D2 to enter the connected mode for D2D recovery, and asks D1 to monitor and measure the uplink control channel of D2. Based on the measurement report sent to the eNB by D1, the eNB decides whether the D2D connection can be recovered. If the answer is yes, the eNB informs both D1 and D2 to proceed with D2D connection recovery.

In another embodiment, when D1 wants to recover the D2D connection to D2 but without the knowledge of when D2 will wake up, it sends the D2D recovery request to the eNB. If the eNB ever received a $T_{wakeup}$ notification from D2, the eNB will send $T_{wakeup}$ to D1. D1 will try to perform the D2D re-connection with D2 at that time. If the eNB has no such information regarding $T_{wakeup}$, the eNB can inform D1 the paging time of D2 so that D1 can try the D2D reconnection during the paging cycle of D2 as described above.

In another embodiment, when Di sends the D2D recovery request to the eNB, if the eNB ever received the $T_{wakeup}$ notification from D2, the eNB can respond to D1 with both the time $T_{wakeup}$ and the paging time of D2. D1 can make a selection between the time $T_{wakeup}$ and the paging time as to when D2D connection recovery should attempted. For example, if the paging time is much earlier than $T_{wakeup}$, the former would be selected if the D2D reconnection is more urgent, e.g., a low latency is required. D1 can notify the eNB as to the selected D2D reconnection time with a parameter $T_{reconnect\_selected}$ which is an indicator as to whether the paging time or $T_{wakeup}$ is selected. If the paging cycle time is used for D2D reconnection, the eNB may ask D1 to do a measurement of D2 for transmit power adjustment during the paging cycle. The eNB can then page D2 with an indication of the D2D reconnection requested by D1. Upon D2 entering the connected mode, both D1 and D2 recover their D2D connection.

Figure 2:
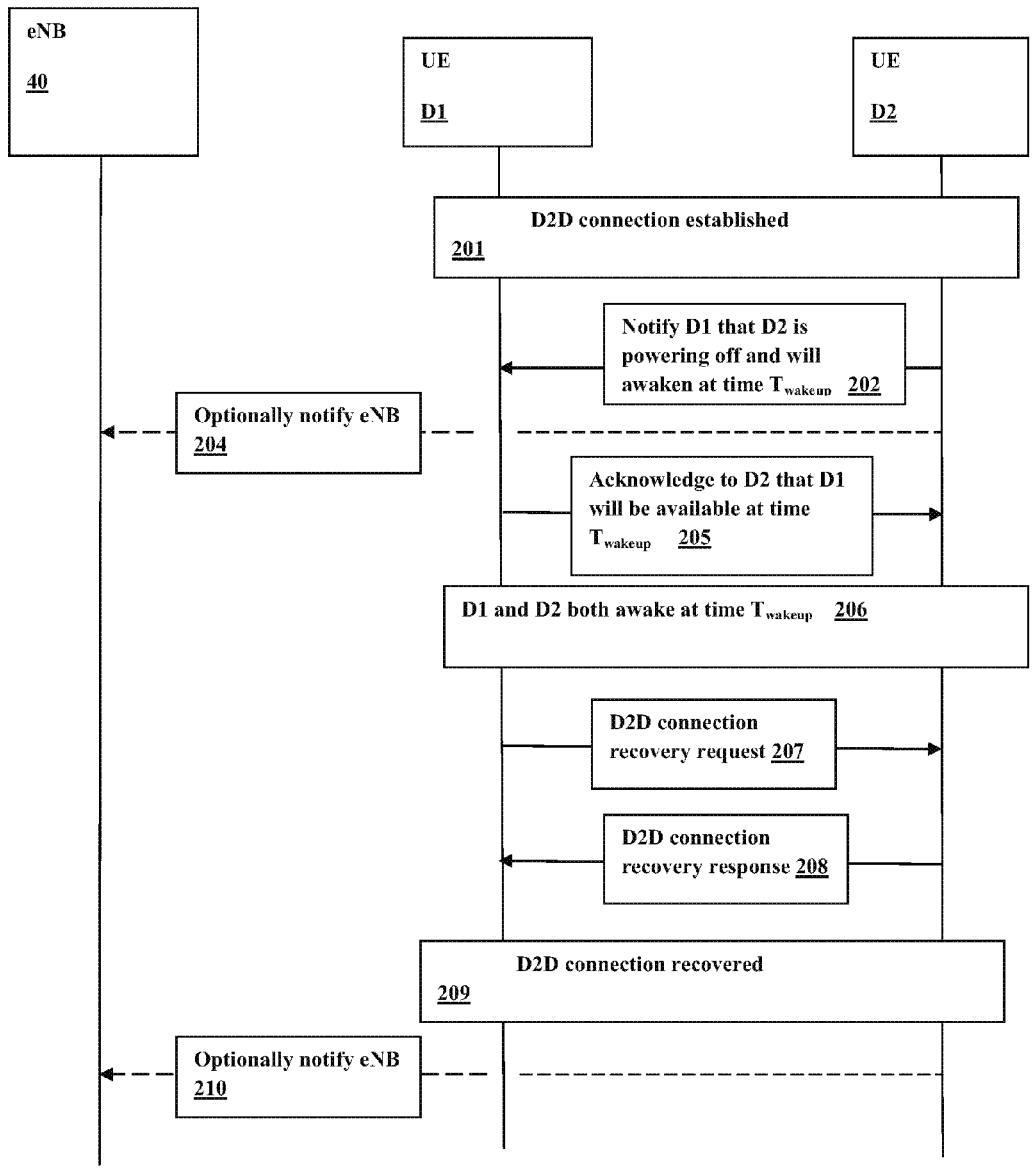
FIG. 2 shows a scheme for D2D connection recovery in one embodiment.

FIG. 2 shows an example scheme for D2D connection recovery between UEs D1 and D2 that does not involve the eNB 40. At step 201, a D2D connection is established between D1 and D2. At step 202, D2 notifies D1 that D2 is entering a sleep state and will be awake at time $T_{wakeup}$. 2 may also optionally notify the eNB at step 204. At step 205, D1 acknowledges the message and tells D2 that it will be awake at time $T_{wakeup}$. Step 206 shows both D1 and D2 awake at time $T_{wakeup}$. D1 sends a D2D connection recovery request to D2 at step 207, and D2 responds to the request at step 208. (Alternatively, D2 could send the D2D connection recovery request to D1) At step 209, the D2D connection is recovered.

Figure 3:
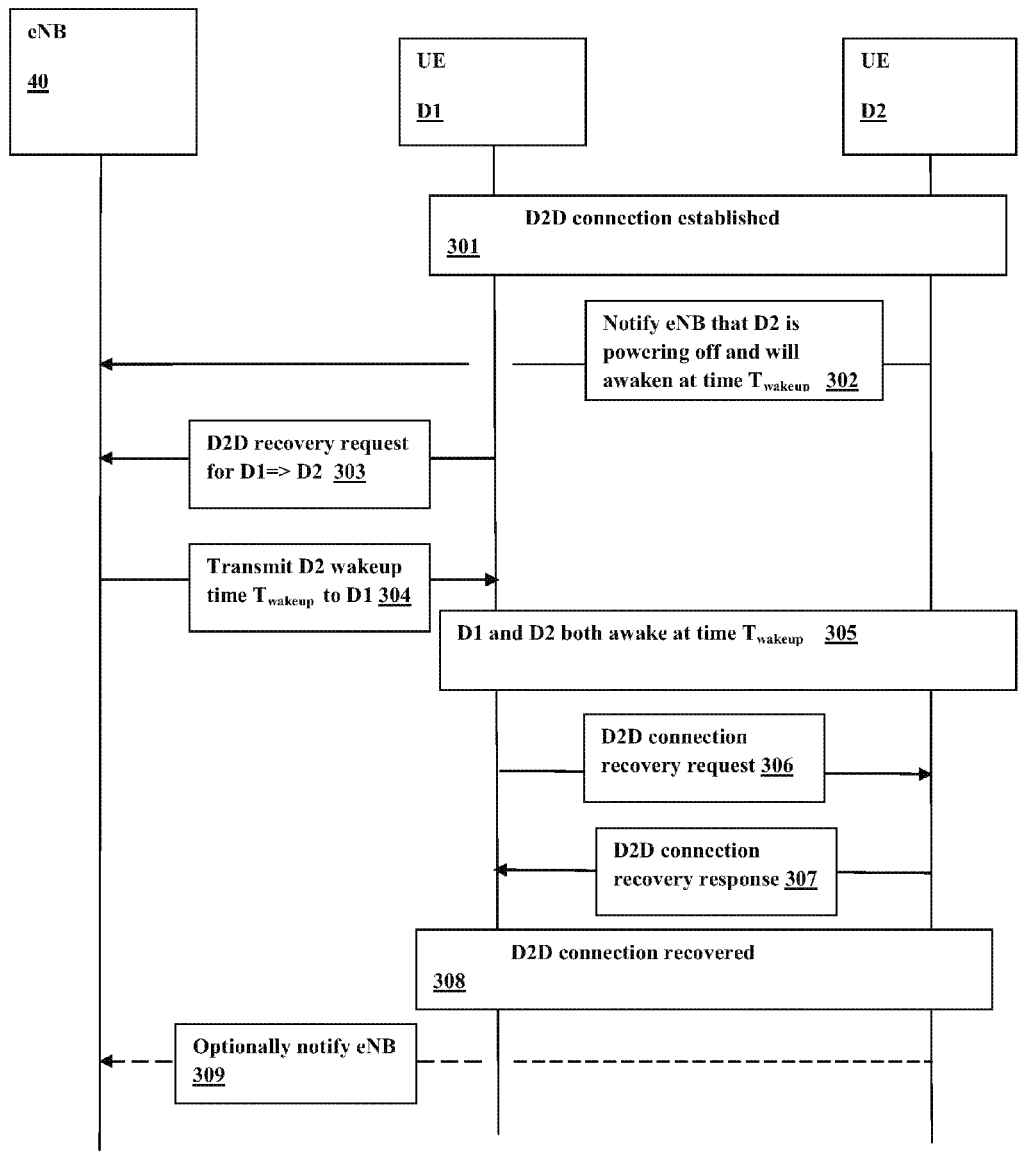
FIG. 3 shows a scheme for D2D connection recovery in one embodiment.

FIG. 3 shows an example scheme for D2D connection recovery between UEs Di and D2 that does involve the eNB 40. At step 301, a D2D connection is established between D1 and D2. At step 302, D2 notifies the eNB, but not D1, that D2 is entering asleep state and will be awake at time $T_{wakeup}$. At step 303, D1 notifies the eNB with a D2D recovery request that it wants to re-establish the D2D connection with D2. At step 304, the eNB transmits D2's wakeup time $T_{wakeup}$ to D1. D1 may or not then enter a sleep state, but both D1 and D2 are awake at step 305. D1 sends a D2D connection recovery request to D2 at step 306, and D2 responds to the request at step 307. (Alternatively, D2 could send the D2D connection recovery request to D1.) At step 308, the D2D connection is recovered. Either D1 or D2 may optionally notify the eNB at the step 309 that the D2D connection has been recovered.

Figure 4:
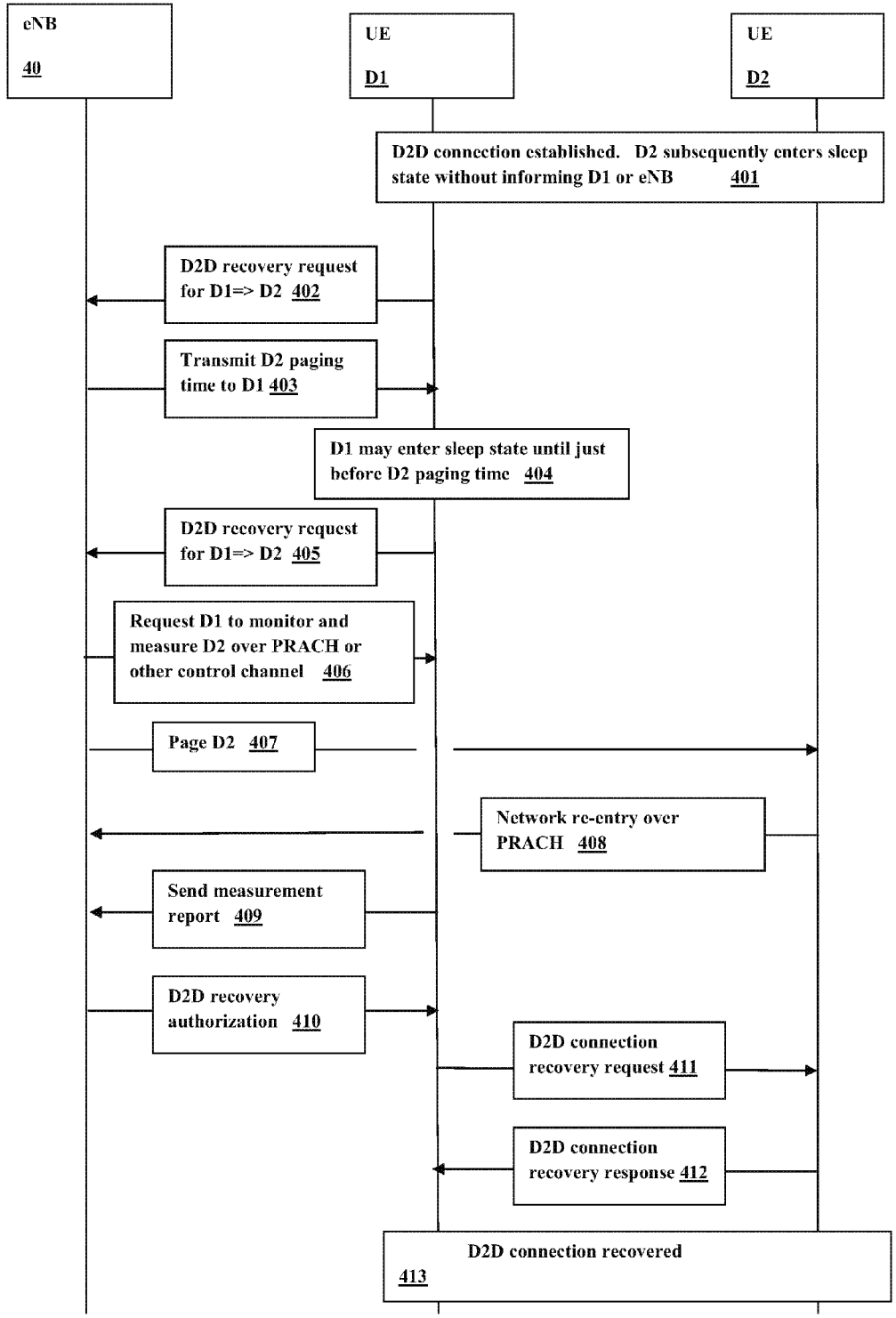
FIG. 4 shows a scheme for D2D connection recovery in one embodiment.

FIG. 4 shows an example scheme for D2D connection recovery between UEs D1 and D2 involving the eNB 40 where D2 enters asleep state without informing either D1 or the eNB of its wakeup time. At step 401, a D2D connection is established between D1 and D2, and D2 subsequently enters asleep state without informing D1 or the eNB. At step 402, D1 sends the eNB a D2D recovery request saying that it wants to re-establish the D2D connection with D2. In response, the eNB transmits the next paging time for D2 to D1 at step 403. D1 may enter a sleep state but is awake before the paging time for D2 at step 404. At step 405, D1 again sends the eNB a D2D recovery request saying that it wants to re-establish the D2D connection with D1. At step 406, the eNB requests D1 to monitor and measure D2's transmissions when it responds to the page over the PRACH (physical random access channel) or transmits on an uplink control channel. D2 is paged by the eNB at step 407. D2 performs the network re-entry procedure over the PRACH at step 408. Di sends the eNB its measurement report of D2's transmissions at step 409. If, based upon the measurement report, the eNB deems the channel quality between D1 and D2 adequate to support a D2D link, a D2D recovery authorization is transmitted to both D1 and D2 at step 410. D1 sends a D2D connection recovery request to D2 at step 411, and D2 responds to the request at step 412. (Alternatively, D2 could send the D2D connection recovery request to D1.) At step 413, the D2D connection is recovered.

Figure 5:
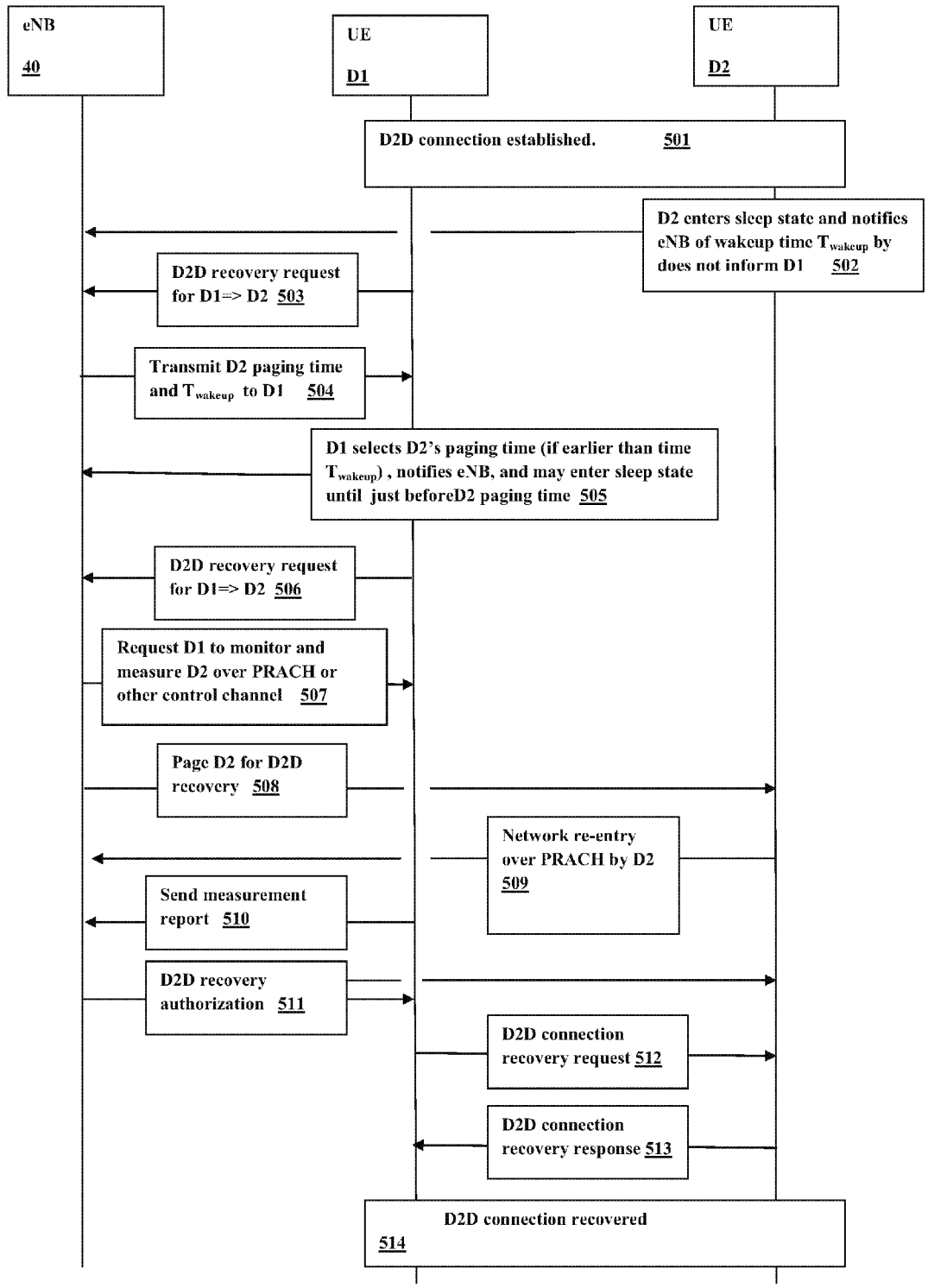
FIG. 5 shows a scheme for D2D connection recovery in one embodiment.

FIG. 5 shows an example scheme for D2D connection recovery between UEs D1 and D2 involving the eNB 40 where D2 enters a sleep state after informing the eNB of its wakeup time. At step 501, a D2D connection is established between D1 and D2, and D2 subsequently at step 502 enters a sleep state informing the eNB, but not D1, of its wakeup time $T_{wakeup}$. At step 503, D1 sends the eNB a D2D recovery request saying that it wants to re-establish the D2D connection with D2. In response, the eNB transmits the next paging time for D2 and D2's wakeup time $T_{wakeup}$ to D1 at step 504. At step 505, D1 selects D2's paging time (assuming it is earlier than time $T_{wakeup}$), notifies the eNB, and may enter a sleep state until just before D2's paging time. At step 506, D1 again sends the eNB a D2D recovery request saying that it wants to re-establish the D2D connection with D2. At step 507, the eNB requests D1 to monitor and measure D2's transmissions when it responds to the page over the PRACH (physical random access channel) or transmits on an uplink control channel. D2 is paged by the eNB at step 508. D2 performs the network re-entry procedure over the PRACH at step 509, and D1 sends the eNB its measurement report of D2's transmissions at step 510. If, based upon the measurement report, the eNB deems the channel quality between D1 and D2 adequate to support a D2D link, a D2D recovery authorization is transmitted to both D1 and D2 at step 511. D1 sends a D2D connection recovery request to D2 at step 512, and D2 responds to the request at step 513. (Alternatively, D2 could send the D2D connection recovery request to D1.) At step 114, the D2D connection is recovered.

Figure 6:
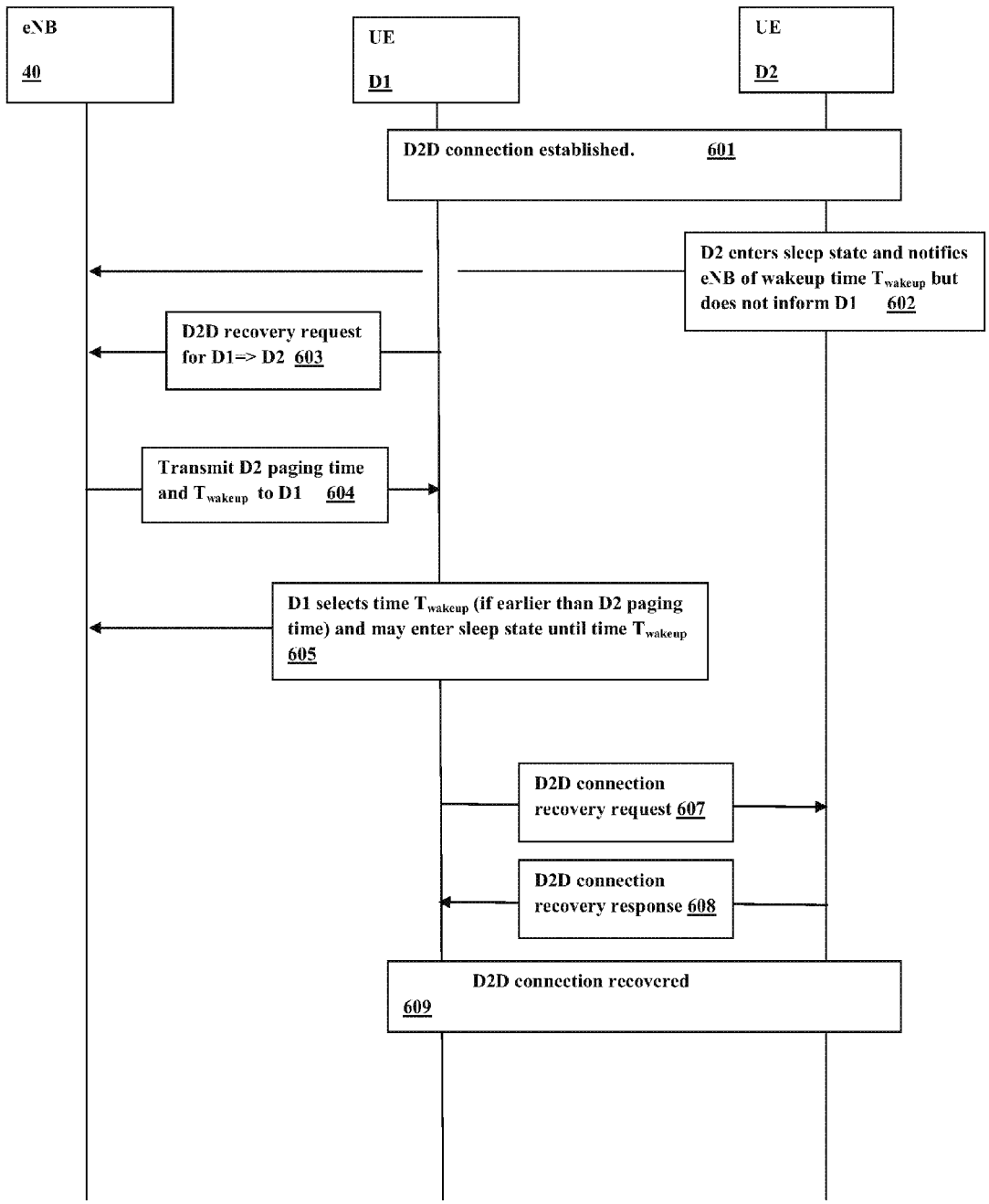
FIG. 6 shows a scheme for D2D connection recovery in one embodiment.

FIG. 6 shows an example scheme for D2D connection recovery between UEs D1 and D2 involving the eNB 40 similar to the scheme illustrated in FIG. 5 but where, for re-establishing the D2D link with D2, D1 selects D2's wakeup time rather than its paging time either because it is earlier or tier other reasons. At step 601, a D2D connection is established between D1 and D2, and D2 subsequently at step 602 enters a sleep state informing the eNB, but not D1, of its wakeup time $T_{wakeup}$. At step 603, D1 sends the eNB D2D recovery request saying that it wants to re-establish the D2D connection with D2, In response, the &NB transmits the next paging time for D2 and D2's wakeup time $T_{wakeup}$ to D1 at step 604. At step 605, D1 selects time $T_{wakeup}$ (assuming it is earlier than D2's paging time), notifies the eNB, and may enter a sleep state until just time $T_{wakeup}$. D1 sends a D2D connection recovery request to D2 at step 607, and D2 responds to the request at step 608. (Alternatively, D2 could send the D2D connection recovery request to D1.) At step 609, the D2D connection is recovered.

Example Embodiments

In one embodiment, a device for operating as user equipment (UE) an LIE network, comprises a radio transceiver to provide an air interface for communicating with an eNB and for D2D communications and processing circuitry connected to the radio transceiver to establish a D2D communications session with a second UE; and, if a message from the second LIE indicating that the second UE is to be entering a sleep state and a wakeup time is received, transmit an acknowledgement message to the second UE and, at the indicated wakeup time, transmit a D2D recovery message to the second UE and wait for a response thereto to re-establish the D2D communications session. The processing circuitry may be further to: if the second UE enters asleep state but no message indicating the wakeup time is received from the second UE, transmit a D2D recovery request to the eNB; if a response to the D2D recovery request is received from the eNB indicating the next paging time and if the second UE responds to a page at the paging time, transmit a D2D recovery message to the second UE at the paging time and wait for a response thereto to re-establish the D2D communications session, The processing circuitry may be further to: if the second UE enters a sleep state but no message indicating the wakeup time is received from the second UE, transmit a D2D recovery request to the eNB; if a response to the D2D recovery request is received from the eNB indicating a wakeup time previously transmitted to the eNB by the second UE, transmit a D2D recovery message to the second UE at the wakeup time and wait for a response thereto to re-establish the D2D communications session. The processing circuitry may be further to: if requested to do so by the eNB, measure the signal transmitted by the second UE when responding to the page over the physical random access channel (PRACH), and transmit a measurement report back to the eNB; and, only if authorized to do so by the eNB in response to the transmitted measurement report, transmit a D2D recovery message to the second UE at the paging time and wait for a response thereto to re-establish the D2D communications session. The processing circuitry may be further to: if requested to do so by the eNB, measure the signal transmitted by the second UE over an uplink control channel after responding to the page, and transmit a measurement report back to the eNB; and, if authorized to do so by the eNB in response to the transmitted measurement report, transmit a D2D recovery message to the second UE at the paging time and wait for a response thereto to re-establish the D2D communications session.

In another embodiment, a device for operating as user equipment (UE) in an LTE network, comprises a radio transceiver to provide an air interface for communicating with an eNB and for D2D communications and processing circuitry connected to the radio transceiver to: establish a D2D communications session with a first UE; if a sleep state is to be entered after establishment of the D2D communications session, transmit a message to the first UE indicating a wakeup time; and, if an acknowledgement message is received from the first UE in response to transmission of the wakeup time thereto and if a D2D recovery request is received from the first UE at the wakeup time, respond to the D2D recovery request to re-establish the D2D communications session. The processing circuitry may be further to, if a sleep state is to be entered after establishment of the D2D communications session, transmit a message to the eNB indicating a wakeup time. The processing circuitry may be further to, after re-establishment of the D2D communications session with the first UE, transmit a message to the eNB indicating that the D2D communications session has been re-established.

In another embodiment, a method for operating an eNB in an LTE network, comprises: allocating time-frequency resources for D2D communications between first and second user equipments (UEs) in response to channel reservation requests received from the first and second UEs; after a D2D communications session between the first and second UEs has been established, and the second UE enters a sleep state, responding to a D2D recovery request from the first UE by transmitting a paging time for the second UE to the first UE. The method may further comprise: after a D2D communications session between the first and second UEs has been established, and the second UE enters asleep state and transmits a wakeup time to the eNB, responding to a D2D recovery request from the first UE by transmitting the wakeup time for the second UE to the first UE. The method may further comprise: after transmitting a paging time for the second UE to the first UE, transmitting a page to the second UE at the paging time along with an indication of the D2D recovery request from the first UE. The method may further comprise: after receiving a D2D recovery request from the first UE, transmitting a measurement request that requests the first UE to measure the signal transmitted by the second UE in responding to the page over the physical random access channel (PRACH). The method may further comprise: after receiving a D2D recovery request from the first UE, requesting the first UE to measure the signal transmitted by the second UE after responding to the page over an uplink control channel. The method may further comprise: after receiving a measurement report from the first UE in response to the measurement request, determining whether the measured signal is adequate, transmitting D2D recovery authorizations to the first and second UE In another embodiment, a method for operating a UE in an LIE network, comprises: establishing a D2D communications session with a second UE; if a message from the second LIE indicating that the second UE is to be entering a sleep state is received, negotiating a wakeup time for the second UE to wake from the sleep state; and transmitting a D2D recovery message to the second UE and wait for a response thereto to re-establish the D2D communications session, The method may further comprise: if the second UE enters asleep state but no message indicating the wakeup time is received from the second UE, transmitting a D2D recovery request to an eNB; if a response to the D2D recovery request is received from the eNB indicating the next paging time and if the second UE responds to a page at the paging time, transmitting a D2D recovery message to the second UE at the paging time and wait for a response thereto to re-establish the D2D communications session. The method may further comprise: if the second UE enters a sleep state but no message indicating the wakeup time is received from the second UE, transmit a D2D recovery request to an eNB; if a response to the D2D recovery request is received from the eNB indicating a wakeup time previously transmitted to the eNB by the second UE, transmitting a D2D recovery message to the second UE at the wakeup time and wait for a response thereto to re-establish the D2D communications session. The method may further comprise: if requested to do so by the eNB, measure the signal transmitted by the second UE when responding to the page over the physical random access channel (PRACH), and transmitting a measurement report back to the eNB; and, only if authorized to do so by the eNB in response to the transmitted measurement report, transmitting a D2D recovery message to the second UE at the paging time and wait for a response thereto to re-establish the D2D communications session. The method may further comprise: if requested to do so by the eNB, measuring the signal transmitted by the second UE over an uplink control channel after responding to the page, and transmitting a measurement report back to the eNB; and, if authorized to do so by the eNB response to the transmitted measurement report, transmitting a D2D recovery message to the second UE at the paging time and waiting for a response thereto to re-establish the D2D communications session. The method may further comprise: establishing a D2D communications session with a first UE; if a sleep state is to be entered after establishment of the D2D communications session, transmit a message to the first UE indicating a wakeup time; if an acknowledgement message is received from the first UE in response to transmission of the wakeup time thereto and if a D2D recovery request is received from the first UE at the wakeup time, respond to the D2D recovery request to re-establish the D2D communications session.

The embodiments as described above may be implemented as methods for operation and/or in various hardware configurations that may include a processor for executing instructions that perform the methods. Such instructions may be contained in a suitable storage medium from which they are transferred to a memory or other processor-executable medium.

The subject matter has been described in the context of an LIE network. Except where inconsistencies would arise, the subject matter could be used in other types of cellular networks with references to a UE and eNB replaced by references to a terminal and base station, respectively.

The subject matter has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The Wowing claims are hereby incorporated into the detailed description, with each claim standing on its own as a separate embodiment.

What is claimed is:

1. A user equipment (UE) device, comprising:
   a radio transceiver to provide an air interface for communicating with an eNB (evolved node B) and for D2D (device-to-device) communications; and
   processing circuitry connected to the radio transceiver to:
   establish a D2D communications session with a second UE,
   if a message from the second UE indicates that the second UE is to be entering a sleep state and a wakeup time is received, transmit an acknowledgement message to the second UE and, at the indicated wakeup time, transmit a D2D recovery message to the second UE and wait for a response thereto to re-establish the D2D communications session;
   if the D2D communications session with the second UE is lost but no message indicating the wakeup time is received from the second UE, transmit a D2D recovery request to the eNB;
   if a response to the D2D recovery request is received from the eNB indicating the next paging time and if the second UE responds to a page at the paging time, transmit a D2D recovery message to the second UE at the paging time and wait for a response thereto to re-establish the D2D communications session.

2. The device of claim 1 wherein the processing circuitry is further to:
   after re-establishment of the D2D communications session with the second UE, transmit a message to the eNB indicating that the D2D communications session has been re-stablished.

3. The device of claim 1 wherein the processing circuitry is further to:
   if the D2D communications session with the second UE is lost but no message indicating the wakeup time is received from the second UE, transmit a D2D recovery request to the eNB;
   if a response to the D2D recovery request is received from the eNB indicating a wakeup time previously transmitted to the eNB by the second UE, transmit a D2D recovery message to the second UE at the wakeup time and wait for a response thereto to re-establish the D2D communications session.

4. The device of claim 1 wherein the processing circuitry is further to:
   if requested to do so by the eNB, measure the signal transmitted by the second UE when responding to the page over the physical random access channel (PRACH), and transmit a measurement report back to the eNB; and,
   if authorized to do on by the eNB in response to the transmitted measurement report, transmit a D2D recovery message to the second UE at the paging time and wait for a response thereto to re-establish the D2D communications session.

5. The device of claim 1 wherein the processing circuitry is further to:
   if requested to do so by the eNB, measure the signal transmitted by the second UE over an uplink control channel after responding to the page, and transmit a measurement report back to the eNB; and,
   if authorized to do so by the eNB in response to the transmitted measurement report, transmit a D2D recovery message to the second UE at the paging time and wait for a response thereto to re-establish the D2D communications session.

6. A user equipment (UE) device, comprising:
   a radio transceiver to provide an air interface for communicating with an eNB (evolved node B) and for D2D (device-to-device) communications; and
   processing circuitry connected to the radio transceiver to:
   establish a D2D communications session with a second UE;
   if a message from the second UE indicates that the second UE is to be entering a sleep state and a wakeup time is received, transmit an acknowledgement message to the second UE and, at the indicated wakeup time, transmit a D2D recovery message to the second UE and wait for a response thereto to re-establish the D2D communications session;
   if the D2D communications session with the second UE is lost but no message indicating the wakeup time is received from the second UE, transmit a D2D recovery request to the eNB;
   if a response to the D2D recovery request is received from the eNB indicating a wakeup time previously transmitted to the eNB b the second UE, transmit a D2D recovery message to the second UE at the wakeup time and wait for a response thereto to re-establish the D2D communications session.

7. The device of claim 6 wherein the processing circuitry is further to, if a sleep state is to be entered after establishment of the D2D communications session, transmit a message to the eNB indicating a wakeup time.

8. The device of claim 6 wherein the processing circuitry is further to, after re-establishment of the D2D communications session with the second UE, transmit a message to the eNB indicating that the D2D communications session has been re-established.

9. A method for operating a user equipment (UE), comprising:

establishing a device-to device (D2D) communications session with a second UE;

if a message from the second UE indicating that the second UE is to be entering a sleep state is received, negotiating a wakeup time for the second UE to wake from the sleep state; and transmitting a D2D recovery message to the second UE at the wakeup time and waiting for a response thereto to re-establish the D2D communications session;

if the D2D communications session with the second UE is lost but no message indicating the wakeup time is received from the second UE, transmitting a D2D recovers request to the eNB;

if a response to the D2D recovery request is received from the eNB indicating a wakeup time previously transmitted to the eNB by the second UE, transmitting a D2D recovery message to the second UE at the wakeup time and waiting for a response thereto to re-establish the D2D communications session.

10. The method of claim 9 further comprising: if a sleep state is to be entered after establishment of the D2D communications session, transmitting a message to the eNB indicating a wakeup time.

11. The method of claim 9 further comprising: after re-establishment of the D2D communications session with the second UE, transmitting a message to the eNB indicating that the D2D communications session has been re-established.

12. The method of claim 9 further comprising: measuring the signal transmitted by the second UE in responding to a page over the physical random access channel (PRACH) in response to a request from the eNB.

13. The method of claim 9 further comprising: measuring the signal transmitted by the second UE after responding to the page over an uplink control channel in response to a request from the eNB.

14. The method of claim 12 further comprising: receiving a D2D recovery authorization from the eNB if the measurement of the signal transmitted by the second UE is adequate.

15. A method for operating a user equipment (UE), comprising:

establishing a device-to device (D2D) communications session with a second UE;

if a message from the second UE indicating that the second UE is to be entering a sleep state is received, negotiating a wakeup time for the second UE to wake from the sleep state; and transmitting a D2D recovery message to the second UE at the wakeup time and waiting for a response thereto to re-establish the D2D communications session;

if the D2D communications session with the second UE is lost but no message indicating the wakeup time is received from the second UE, transmitting a D2D recovery request to an eNB;

if a response to the D2D recovery request is received from the eNB indicating the next paging time and if the second UE responds to a page at the paging time, transmitting a D2D recovery message to the second UE at the paging time and waiting for a response thereto to re-establish the D2D communications session.

16. The method of claim 15 further comprising:

after re-establishment of the D2D communications session with the second UE, transmitting a message to the eNB indicating that the D2D communications session has been re-established.

17. The method of claim 15 further comprising:

if the D2D communications session with the second UE is lost but no message indicating the wakeup time is received from the second UE, transmitting a D2D recovery request to an eNB;

if a response to the D2D recovery request is received from the eNB indicating a wakeup time previously transmitted to the eNB by the second UE, transmitting a D2D recovery message to the second UE at the wakeup time and waiting for a response thereto to re-establish the D2D communications session.

18. The method of claim 16 further comprising:

if requested to do so by the eNB, measuring the signal transmitted by the second UE when responding to the page over the physical random access channel (PRACH), and transmitting a measurement report back to the eNB; and, if authorized to do so by the eNB in response to the transmitted measurement report, transmitting a D2D recovery message to the second UE at the paging time and waiting for a response thereto to re-establish the D2D communications session.

19. The method of claim 16 further comprising:

if requested to do so by the eNB, measuring the signal transmitted by the second UE over an uplink control channel after responding to the page, and transmitting a measurement report back to the eNB; and, if authorized to do so by the eNB in response to the transmitted measurement report, transmitting a D2D recovery message to the second UE at the paging time and waiting for a response thereto to re-establish the D2D communications session.

20. The method of claim 15 further comprising:

if a sleep state is to be entered after establishment of the D2D communications session with the second UE, transmitting a message to the second UE indicating a wakeup time;

if an acknowledgement message is received from the second UE in response to transmission of the wakeup time thereto and if a D2D recovery request is received from the second UE at the wakeup time, responding to the D2D recovery request to re-establish the D2D communications session.

* * * * *